E. O. C. ORD.
DISH WASHING PAN.
APPLICATION FILED AUG. 30, 1910. RENEWED AUG. 29, 1911.
1,014,509. Patented Jan. 9, 1912.
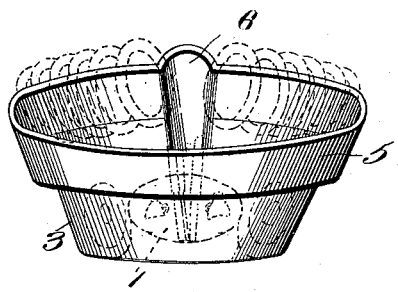
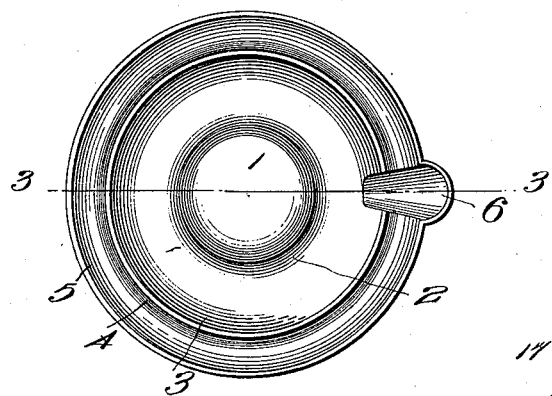
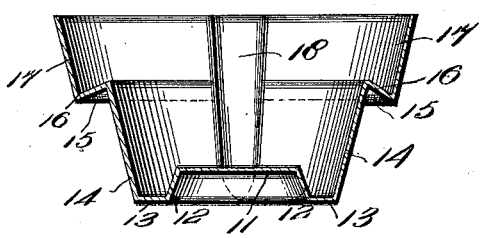
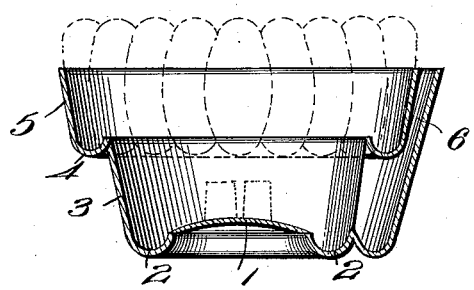
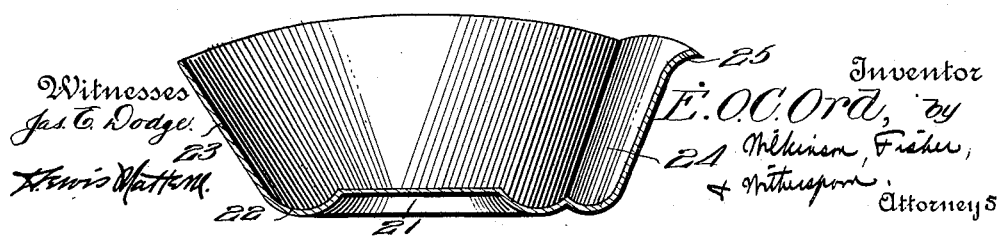

UNITED STATES PATENT OFFICE.

EDWARD O. C. ORD, OF PRESCOTT, ARIZONA TERRITORY.

DISH-WASHING PAN.

1,014,509.  Specification of Letters Patent.  Patented Jan. 9, 1912.

Application filed August 30, 1910, Serial No. 579,674. Renewed August 29, 1911. Serial No. 646,687.

*To all whom it may concern:*

Be it known that I, EDWARD O. C. ORD, a citizen of the United States, residing at Prescott, in the county of Yavapai and Territory of Arizona, have invented certain new and useful Improvements in Dish-Washing Pans, of which the following is a specification.

My present invention relates to improvements in dish washing pans, and it consists in providing a pan having a raised bottom surrounded with an annular groove into which the sediment in the washing water settles, and also preferably provided with a shelf having an annular groove in same, said annular groove being adapted to hold plates, saucers, or the like on end and said shelf being adapted to receive cups, tumblers, or the like, the idea being that the sediment settles in the annular grooves, leaving the main body of the water substantially clear, while the plates, saucers, or the like may be removed without dipping the hands in the water. A spout is also preferably provided, which is useful not only in pouring out the water, but in which may be stood on end knives, forks, or the like, and the handles of the knives and forks may be thus kept out of the water.

My invention will be understood by reference to the accompanying drawings, in which the same parts are indicated by the same numerals throughout the several views.

Figure 1 represents a perspective view of the preferred form of dish washing pan. Fig. 2 is a plan view of same. Fig. 3 is a vertical section along the line 3—3 of Fig. 2, in Figs. 1 and 3 the crockery being washed as indicated in dotted lines. Fig. 4 shows a section through a modified form of pan, and Fig. 5 shows a section through still another modification.

Referring first to Figs. 1 to 3, 1 indicates the raised bottom of the pan, which is preferably curved, as shown in Fig. 3. This raised bottom is surrounded by an annular groove 2, above which the side wall is inclined outwardly as at 3, and a shelf is provided, comprising the annular groove 4 below the inclined top 5 of the pan. A spout 6 is provided at the side of the pan, out of which the liquid contents of the pan may be poured, and also while the pan is in use this spout may be used to contain knives, forks, spoons, or the like. The larger dishes and larger plates are preferably stood up on end in the groove 2, while the smaller plates, saucers, or the like are preferably stood up on end in the groove 4. These plates or saucers, etc., would normally project partly above the water and may be turned around by hand, so that all parts may be immersed and washed, without the necessity of dipping the hands of the washer into the water.

In the modification shown in Fig. 4, the raised portion 11 of the bottom is connected by the sloping surface 12 to the flat bottom 13, which with the sloping sides 14 forms a groove in which the sediment settles. The shelf 15 slopes downward, forming another groove 16, and the top of the pan 17 slopes outward. A spout 18 is provided, as already described.

In the modification shown in Fig. 5, the shelf of the pan is omitted and the raised bottom 21 is flat adjoining the groove 22, in which the sediment settles, while the sides 23 slope upward and outward. A spout 24 is provided, preferably curved outward as at 25.

It will be noted that in all the forms of the device, between the raised bottom of the pan and the outer wall thereof, there is a comparatively deep groove which serves to hold the plates or flat dishes substantially on end, and accessible to the mop of the dish washer.

Having thus described my invention, what I claim and desire to secure by Letters Patent of the United States is:—

1. In a dish washing pan, the combination of a vessel having a raised bottom portion surrounded by an annular groove for receiving the sediment from the liquid in the vessel, and the side of the vessel being provided with a recess communicating with the annular groove for holding knives, forks and spoons and also to serve as a spout, substantially as described.

2. In a dish washing pan, the combination of a vessel having an annular grooved shelf for holding dishes formed in its side, and a vertical spout formed in the side of the vessel and communicating with the bottom of the pan and with said annular groove of the shelf for holding knives, forks and spoons, substantially as described.

3. In a dish washing pan, the combination of a vessel having a raised bottom portion surrounded by an annular groove for the settling of sediment, an annular grooved shelf for holding dishes formed in the side of the vessel, and a vertical spout formed in the side of the vessel and communicating with the annular groove in the bottom of the pan and with said annular groove of the shelf for holding knives, forks and spoons on their ends, substantially as described.

In testimony whereof I have hereunto affixed my signature, in presence of two witnesses.

EDWARD O. C. ORD.

Witnesses:
J. F. RILEY,
L. H. ANDERSON.

Copies of this patent may be obtained for five cents each, by addressing the "Commissioner of Patents, Washington, D. C."